United States Patent
Filho et al.

(12) 
(10) Patent No.: US 11,016,813 B2
(45) Date of Patent: May 25, 2021

(54) OPTIMIZING INITIATOR ALLOCATION

(71) Applicant: International Business Machines Corporation, Armonk, NY (US)

(72) Inventors: Aldair F. Filho, Aimores (BZ); Juscelino Candido de Lima Junior, Campinas (BZ); Marcos Vinicius L. Paraiso, Campinas (BZ); Rosana Rueda Elias, Campinas (BZ); Ana Silvia Moretto Braga, Campinas (BZ)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 16/199,695

(22) Filed: Nov. 26, 2018

(65) Prior Publication Data

US 2020/0167194 A1 May 28, 2020

(51) Int. Cl.
*G06F 9/46* (2006.01)
*G06F 9/50* (2006.01)
*G06F 9/48* (2006.01)

(52) U.S. Cl.
CPC ............ *G06F 9/505* (2013.01); *G06F 9/4881* (2013.01); *G06F 9/5077* (2013.01); *G06F 2209/501* (2013.01); *G06F 2209/5019* (2013.01)

(58) Field of Classification Search
None
See application file for complete search history.

(56) References Cited

U.S. PATENT DOCUMENTS

| | | | |
|---|---|---|---|
| 5,212,793 A | 5/1993 | Donica et al. | |
| 8,281,310 B2 | 10/2012 | Chan | |
| 8,572,616 B2 | 10/2013 | Cai et al. | |
| 8,789,058 B2 | 7/2014 | Li et al. | |
| 10,140,626 B1* | 11/2018 | Peeters | G06F 9/5077 |
| 2007/0277174 A1* | 11/2007 | Cai | G06F 9/5038 718/101 |
| 2008/0275944 A1* | 11/2008 | D'Angelo | G06F 16/2379 709/203 |
| 2012/0144157 A1* | 6/2012 | Crew | G06F 9/5066 712/30 |

(Continued)

OTHER PUBLICATIONS

IBM, "Workload management", https://www.ibm.com/it-infrastructure/z/zos-workload-management, Jul. 31, 2018, 5 pgs.

(Continued)

*Primary Examiner* — Kenneth Tang
(74) *Attorney, Agent, or Firm* — William H. Hartwell; Hunter E. Webb; Keohane & D'Alessandro, PLLC

(57) ABSTRACT

An approach for allocating mainframe resources in a networked computing environment (e.g., a cloud computing environment) is provided. In an embodiment, each workload that executes on a mainframe system is classified into one or a plurality of workload classes. Each workload class has workloads that share a common objective. A historical allocation of initiators for each workload class over time is analyzed. Based on this analysis, a number of allocation selections, which each assign a number of initiators to each workload class, are generated based on the historical utilization data. The allocation selection that is ultimately implemented is selected from these allocation selections based on KPI factors.

20 Claims, 9 Drawing Sheets

(56) References Cited

U.S. PATENT DOCUMENTS

| | | | |
|---|---|---|---|
| 2013/0185729 A1* | 7/2013 | Vasic | G06F 9/5072 |
| | | | 718/104 |
| 2016/0179573 A1 | 6/2016 | Kneisel et al. | |
| 2016/0283274 A1 | 9/2016 | Kochunni et al. | |
| 2016/0285966 A1* | 9/2016 | Brech | G06F 3/126 |
| 2017/0220385 A1* | 8/2017 | Shazly | G06F 9/505 |
| 2017/0364390 A1* | 12/2017 | Bland | G06F 8/60 |

OTHER PUBLICATIONS

IBM, "Processing work on z/OS: How the system starts and manages batch jobs", IBM Knowledge Center, https://www.ibm.com/support/knowledgecenter/zosbasics/com.ibm.zos.zconcepts/zconc_batchjeses.htm, Jan. 4, 2018, 3 pgs.

Tivoli Software, "Job Scheduler Monitoring", https://publib.boulder.ibm.com/tividd/td/BSM/GC32-0799-01/en_US/HTML/bsma19.htm, Jan. 4, 2018, 27 pgs.

* cited by examiner

OPTIMIZING INITIATOR ALLOCATION

TECHNICAL FIELD

In general, embodiments of the present invention relate to server resource allocation. Specifically, embodiments of the present invention relate to an approach for more efficiently allocating initiators in a mainframe environment.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Providers in the networked computing environment often deliver common business applications (e.g., business applications having the same or substantially similar scope, function, and/or application) online, which can be accessed via a web service and/or software, such as a web browser. Individual clients can run virtual machines (VMs) that utilize these common business applications and store the data in the networked computing environment. The physical servers underlying the virtualization can utilize various solutions in providing these services. Some physical servers may host multiple virtual server environments on a single physical machine as virtual machines or containers. Others may be previous generation mainframe machines that execute jobs in a batch environment. These mainframes may be stand-alone machines or can be integrated into the larger network computing environment using a workload manager, such as a job entry system (JES) or IBM Workload Manager.

SUMMARY

In general, an approach for allocating mainframe resources in a networked computing environment (e.g., a cloud computing environment) is provided. In an embodiment, each workload that executes on a mainframe system is classified into one or a plurality of workload classes. Each workload class has workloads that share a common objective. A historical allocation of initiators for each workload class over time is analyzed. Based on this analysis, a number of allocation selections, which each assign a number of initiators to each workload class, are generated based on the historical utilization data. The allocation selection that is ultimately implemented is selected from these allocation selections based on key performance indicator (KPI) factors.

One aspect of the present invention provides a method for allocating mainframe resources in a networked computing environment, the method comprising the computer-implemented processes of: classifying, using a computer device, each workload of a plurality of workloads on a computer mainframe system into one of a plurality of workload classes, the workloads in each workload class of the plurality of workload classes being grouped together based on a common objective; analyzing, using the computer device, a historical allocation of initiators in a mainframe system for each workload class; generating, by the computer device, a plurality of allocation selections based on the analysis, each allocation selection of the plurality of allocation selections assigning a number of initiators to each workload class based on the historical utilization data; and implementing, by the computer device, an allocation selection selected from the plurality of allocation selections based on a KPI factor.

Another aspect of the present invention provides a system for allocating mainframe resources in a networked computing environment, comprising: a memory medium comprising instructions; a bus coupled to the memory medium; and a processor coupled to the bus that when executing the instructions causes the system to: classify each workload of a plurality of workloads on a computer mainframe system into one of a plurality of workload classes, the workloads in each workload class of the plurality of workload classes being grouped together based on a common objective; analyze a historical allocation of initiators in a mainframe system for each workload class; generate a plurality of allocation selections based on the analysis, each allocation selection of the plurality of allocation selections assigning a number of initiators to each workload class based on the historical utilization data; and implement an allocation selection selected from the plurality of allocation selections based on a KPI factor.

Yet another aspect of the present invention provides a computer program product for allocating mainframe resources in a networked computing environment, the computer program product comprising a computer readable hardware storage device, and program instructions stored on the computer readable hardware storage device, to: classify each workload of a plurality of workloads on a computer mainframe system into one of a plurality of workload classes, the workloads in each workload class of the plurality of workload classes being grouped together based on a common objective; analyze a historical allocation of initiators in a mainframe system for each workload class; generate a plurality of allocation selections based on the analysis, each allocation selection of the plurality of allocation selections assigning a number of initiators to each workload class based on the historical utilization data; and implement an allocation selection selected from the plurality of allocation selections based on a KPI factor.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings.

Figure 1:
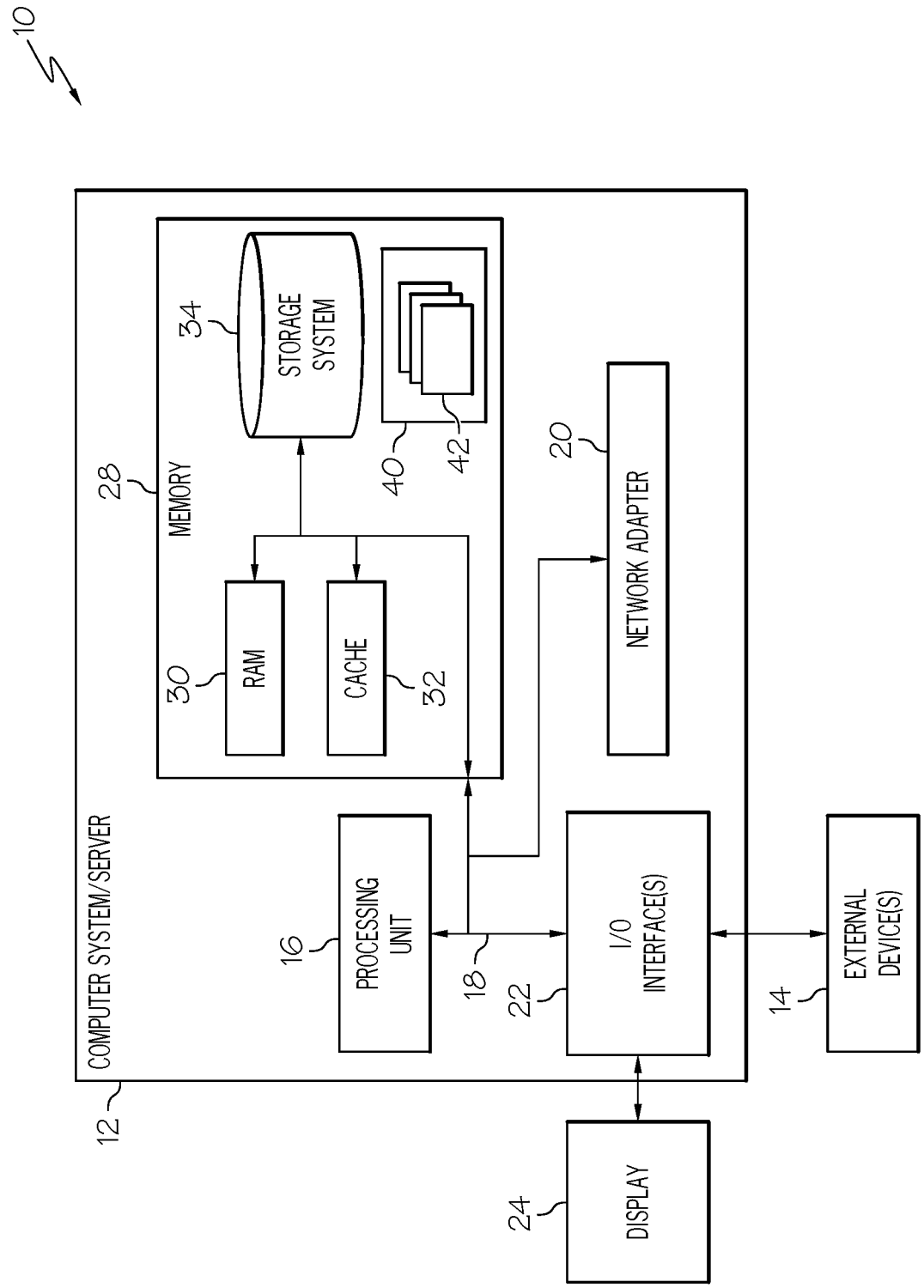
FIG. 1 depicts an example data processing system according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for allocating mainframe resources in a networked computing environment (e.g., a cloud computing environment) is provided. In an embodiment, each workload that executes on a mainframe system is classified into one or a plurality of workload classes. Each workload class has workloads that share a common objective. A historical allocation of initiators for each workload class over time is analyzed. Based on this analysis, a number of allocation selections, which each assign a number of initiators to each workload class, are generated based on the historical utilization data. The allocation selection that is ultimately implemented is selected from these allocation selections based on KPI factors.

Referring now to FIG. 1, a schematic of an example of a data processing system is shown. Data processing system 10 is only one example of a suitable data processing system and is not intended to suggest any limitation as to the scope of use or functionality of embodiments of the invention described herein. Regardless, data processing system 10 is capable of being implemented and/or performing any of the functionality set forth hereinabove.

In data processing system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in data processing system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
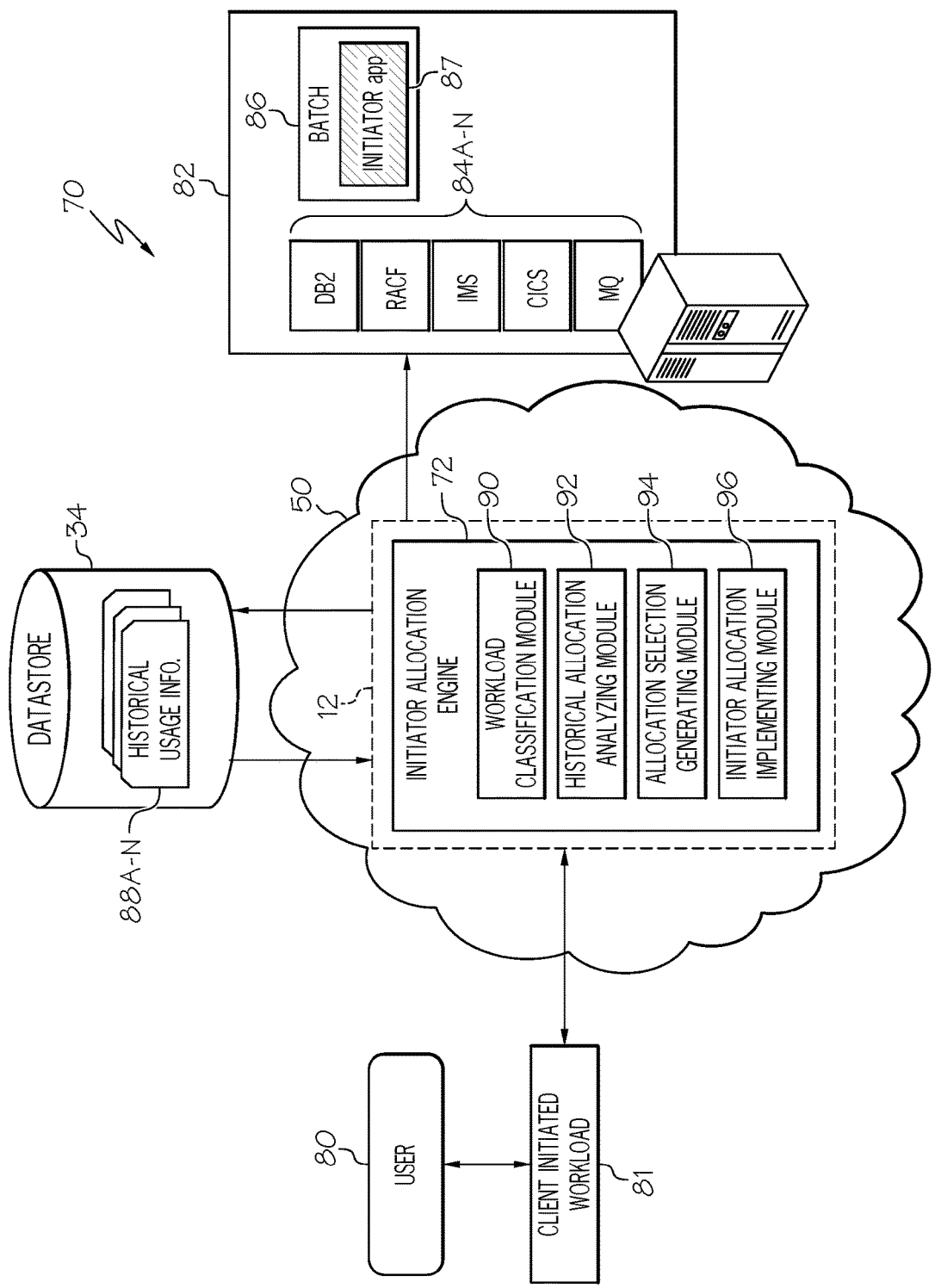
FIG. 2 depicts an example system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each mainframe device 82 need not have an initiator allocation engine (hereinafter "system 72"). Rather, system 72 could be loaded on a server or server-capable device that communicates (e.g., wirelessly) with mainframe device 82 to provide processing therefor. Additionally, or in the alternative, all or portions of system 72 can execute, along with other applications 84A-N, as an initiator application 87 in batch environment 86 on mainframe device 82 (e.g., in a Z/OS operating system environment on an IBM z14 physical machine). Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands to allocate mainframe device 82 resources (e.g., initiators) in networked computing environment 70. Such other system(s) have not been shown in FIG. 2 for brevity purposes.

Along these lines, system 72 may perform multiple functions similar to a general-purpose computer. Specifically, among other functions, system 72 can allocate mainframe 82 resources (e.g., initiators 88) in networked computing environment 70. To accomplish this, system 72 can include: a workload classification module 90, a historical allocation analyzing module 92, an allocation selection generating module 94, and an initiator allocation implementing module 96.

Figure 3:
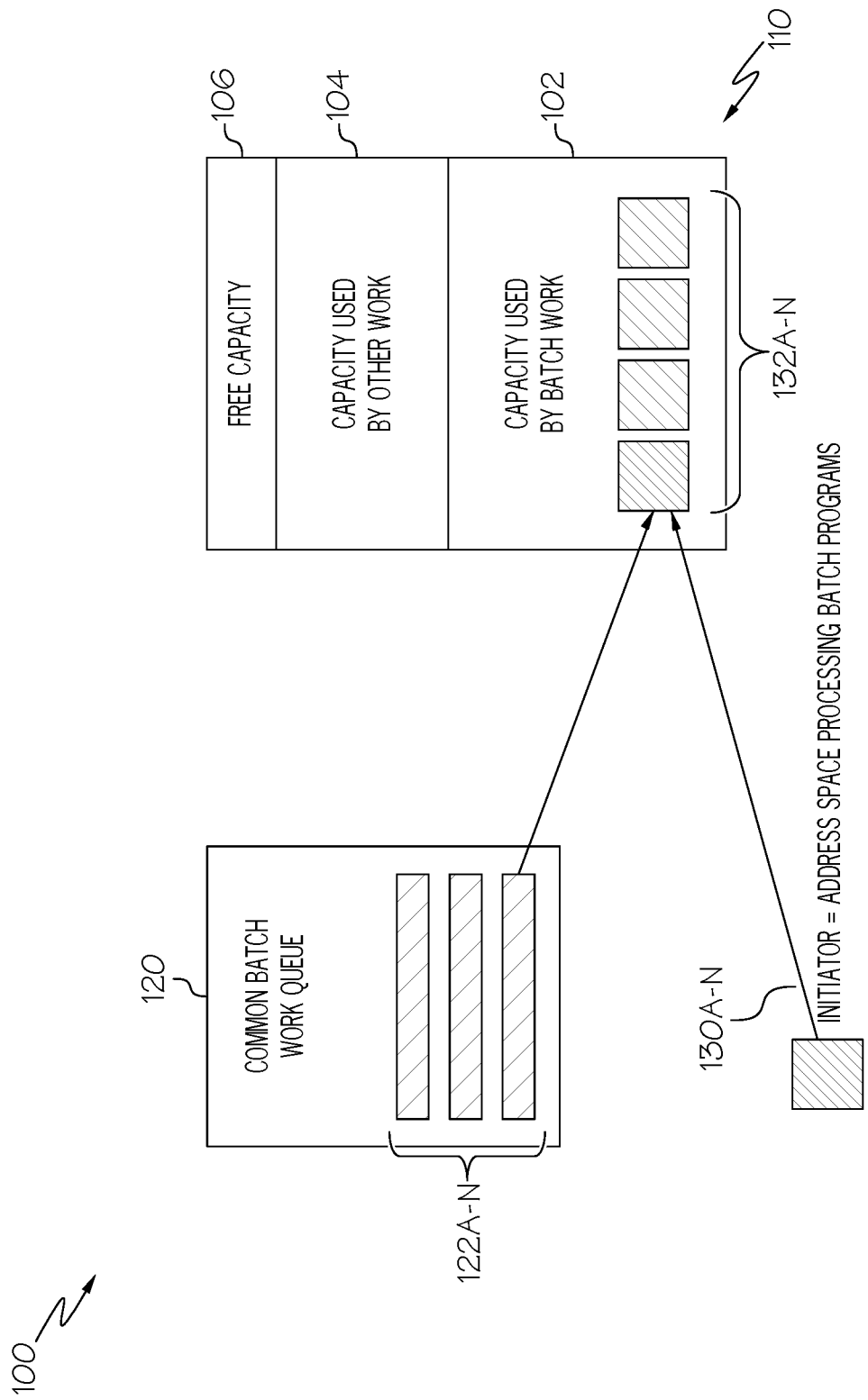
FIG. 3 depicts an example batch processing environment according to an embodiment of the present invention.

Referring to FIG. 3, an example batch processing environment 100 is shown according to an embodiment of the invention. As shown, batch processing environment 100 includes a mainframe workspace 110, which could be a Z/OS workspace, and a common batch work queue 120. Mainframe workspace 110 has capacity for a number of different types of work including, but not limited to, capacity used by batch work 102, capacity used by other work 104 (e.g., on demand user workloads, etc.), free capacity 106, and/or the like. As included herein, batch work can be understood as including scheduled jobs that are often run at a scheduled time of day and/or on a particular day of the week, day of the month, day of the quarter, day of the year, etc. These batch jobs are often scheduled to execute in conjunction with (e.g., before, after, or during) other related batch jobs to accomplish a common objective. To this extent, common batch work queue 120 contains a set of queued workloads 122A-N (referred to singly as workload 122N) to be executed in mainframe workspace 110 when capacity used by batch work 102 becomes available. As also shown, mainframe workspace 110 includes a set of initiators 130A-N (referred to singly as initiator 130N). In order for a workload 122N to begin execution, it must be allocated an initiator 130N, which reads, interprets, and executes the job control language (JCL) in workload 122N to begin the execution. As shown, initiators 130A-N are assigned address spaces 132A-N (referred to singly as address space 132N), with initiator 130N managing the execution of a single workload 122N at a time in its assigned address space 132N. For example, if ten initiators 130A-N are active (in ten address spaces 132A-N), then ten workloads 122A-N can execute at one time in capacity used for batch work 102 mainframe workspace 110.

The inventors of the invention described herein have discovered certain deficiencies in the current solutions for allocating mainframe resources (e.g., initiators 130A-N) in a networked computing environment. For example, current solutions allocate initiators 130A-N on a first come first served basis. These solutions suffer from the fact that if a larger than expected number of new related workloads 122A-N arrive in common batch work queue 120 and request initiators 130A-N, these new workloads 122A-N may monopolize most or all available initiators 130A-N causing execution of other workloads 122A-N to be delayed. This could become particularly problematic in the case that a denial of service attack overloads the available initiators 130A-N, causing normal workload 122A-N to come to a halt. Moreover, current attempts to allocate initiators 130A-N based on previous usage rely on an administrator reviewing log files and setting an allocation amount. However, as log files are not specifically designed for this purpose, the process of manually reviewing these log files can be long and arduous. Moreover, there is currently no way to modify this allocation in response to changing conditions, such as the previously mentioned arrival of a larger than expected number of new related workloads 122A-N in mainframe workspace 110.

The currently described invention addresses these deficiencies in the current solutions by allocating initiators 130A-N according to workload classes, with each new incoming workload 122N being assigned to a workload class. This class-based assignment of initiators ensures that no one group of workloads 122A-N can monopolize available initiators 130A-N, as initiators 130A-N are not shared among workload classes. The initiators 122A-N are allocated to each workload class based on the historical allocation 88A-N of initiators 122A-N allocated to each class. As such, the allocation can be dynamically changed to reflect the expected conditions for the date and time of current operation. Moreover, this allocation can also be dynamically changed to reflect unexpected incoming workloads and/or to reschedule these new workloads if mainframe workspace 110 is unable to accommodate them at the time of arrival. The result of these improvements is improved processing of workloads 122A-N in all workload classes over time, increasing the efficiency with which mainframe computers can process workloads and saving mainframe administrators time and resources.

Referring again to FIG. 2 in conjunction with FIG. 3, workload classification module 90 of system 72, as executed by computer system/server 12, is configured to classify each workload on mainframe device 82 into one of a plurality of workload classes. The result of this classifying is a plurality of workload classes having workloads that are grouped together based on a common objective. For example, a particular workload class could include workloads 122A-N, initiated by the same entity, those originating from a particular business unit, those related to a particular function, and/or the like. To accomplish this, workload classification module 90 (e.g., utilizing tools in the mainframe's job entry system (JES) or otherwise) can review historical usage information 88A-N (e.g., in datastore 34) to determine workloads 122A-N that have a common objective with other workloads 122A-N by looking for workloads 122A-N that are related, execute in conjunction with one another, share a user 80 with, operate in the same business area, are steps in a common solution, etc. These workloads can be grouped together in a common workload group for the purpose of initiator 122A-N allocation. Then, as each new client initiated workload 81 is received, the objective of the new client initiated workload 81 can be compared to the objectives of currently defined workload classes. If the objective of the new client initiated workload 81 matches that of an existing workload class, the new client initiated workload 81 can be assigned to that existing workload class. Otherwise, a new workload class can be created and the new client initiated workload 81 can be assigned to the new workload class.

Historical allocation analyzing module 92 of system 72, as executed by computer system/server 12, is configured to analyze a historical allocation of initiators in mainframe system 82 for each workload class. To accomplish this, an indexed database (e.g., datastore 34) can be populated with usage information 88A-N. This usage information 88A-N can include a start time and an end time for each workload on the mainframe over an extended time period. This extended time period can encompass a number of months that is at least a year and preferably at least 18 months. The usage information 88A-N can be collected as workloads 122A-N are utilizing mainframe system 82 or, alternatively or additionally, can be collected periodically (e.g., hourly, daily, weekly, monthly, and/or the like). In any case, usage information 88A-N is analyzed by historical allocation analyzing module 92 to determine mainframe 82 usage by workload class for each second on the mainframe. Based on this mainframe usage, a set of periodic usage patterns can be determined for each workload class.

Figure 4:
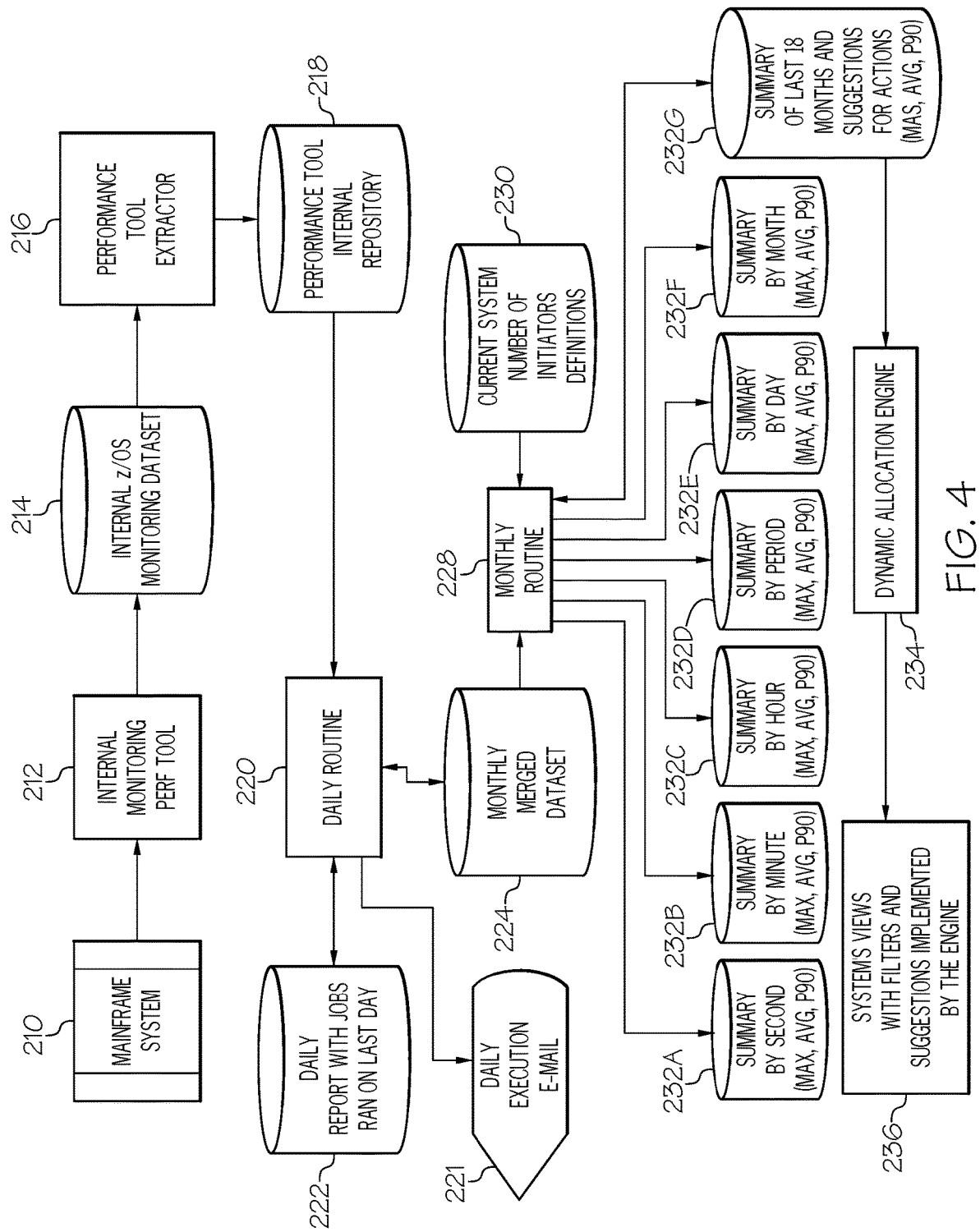
FIG. 4 an example data flow diagram according to an embodiment of the present invention.

Referring now to FIG. 4 in conjunction with FIGS. 2 and 3, an example data flow diagram 200 is shown according to embodiments of the present invention. As illustrated, flow begins with workloads 122A-N running on a mainframe operational system 210. It is usual to have three different kinds of workloads 122A-N running on each logical partition (Ipar) environment. Two of these, referred to jointly herein as client initiated workload 81, include workloads from online users, which can be submitted in real time, and started tasks, which are special programs initiated by console operators. The three kinds of workload also includes batch jobs that are coded in a high level programming language (e.g., COBOL) and submitted by a user 80 (or by a system automation tool) and that usually process a greater amount of data than those of online users.

Whatever the case, the processing of workloads 122A-N by mainframe operational system 210 is monitored by internal monitoring performance tool 212 and data from the monitoring is stored in internal monitoring dataset 214. This data is used to measure the availability of initiators 122A-N by performance tool extractor 216 and the results are stored in performance tool internal repository 218. From this information, a daily routine 220 that includes a set of programs developed in a high level programming language (e.g., COBOL) can generate a dataset with the information about the workload of each class considering the amount of jobs, seconds, and minutes spent by each job. Based on this dataset, a daily report can be created, which can be stored in a repository of daily reports run on previous days 222 and included in a daily execution email 221 with identification and suggestions of which initiators 122A-N could be allocated for a specific situation. In addition, the information in the dataset can be included in a monthly merged dataset 224 that aggregates the daily dataset information over the course of an entire month.

The aggregated data in the monthly merged dataset 224 can be combined with a current system number of initiators definitions 230 via a monthly routine 228 to generate a number of summaries 232A-G by different time periods (second, minute, hour, etc.). These summaries 232A-G can include a summary of at least 18 months, which includes suggestions for actions 232G that can be used by historical allocation analyzing module 92 in performing its functions.

Allocation selection generating module 94 of system 72, as executed by computer system/server 12, is configured to generate a plurality of allocation selections based on the analysis performed by historical allocation analyzing module 92. Each of the generated allocation selections assigns a number of initiators to each workload class based on the historical utilization data. Each generated allocation selection could be designed to reflect different potential operating conditions on mainframe 82. For example, one generated allocation selection could be designed to operate in average volume while another could be designed to operate in a heavy volume situation while still another could be designed to operate in full volume conditions. To this extent, summary of at least 18 months created by monthly routine 228 can also include suggestions for actions 232G. Because information from at least the last 18 months is retained, these suggestions can be used to determine usage trends as well. These usage trends can be used to compute the maximum (peak), average, and percentile 90 (e.g., 90% of peak usage) data by period for any time period within the 18 months in the system. Based on these, allocation selection generating module 94 can generate a dataset with a number of suggested actions that are based on a perspective point of view at the particular time that takes into account date from the entire period of at least 18 months already processed.

Figure 5:
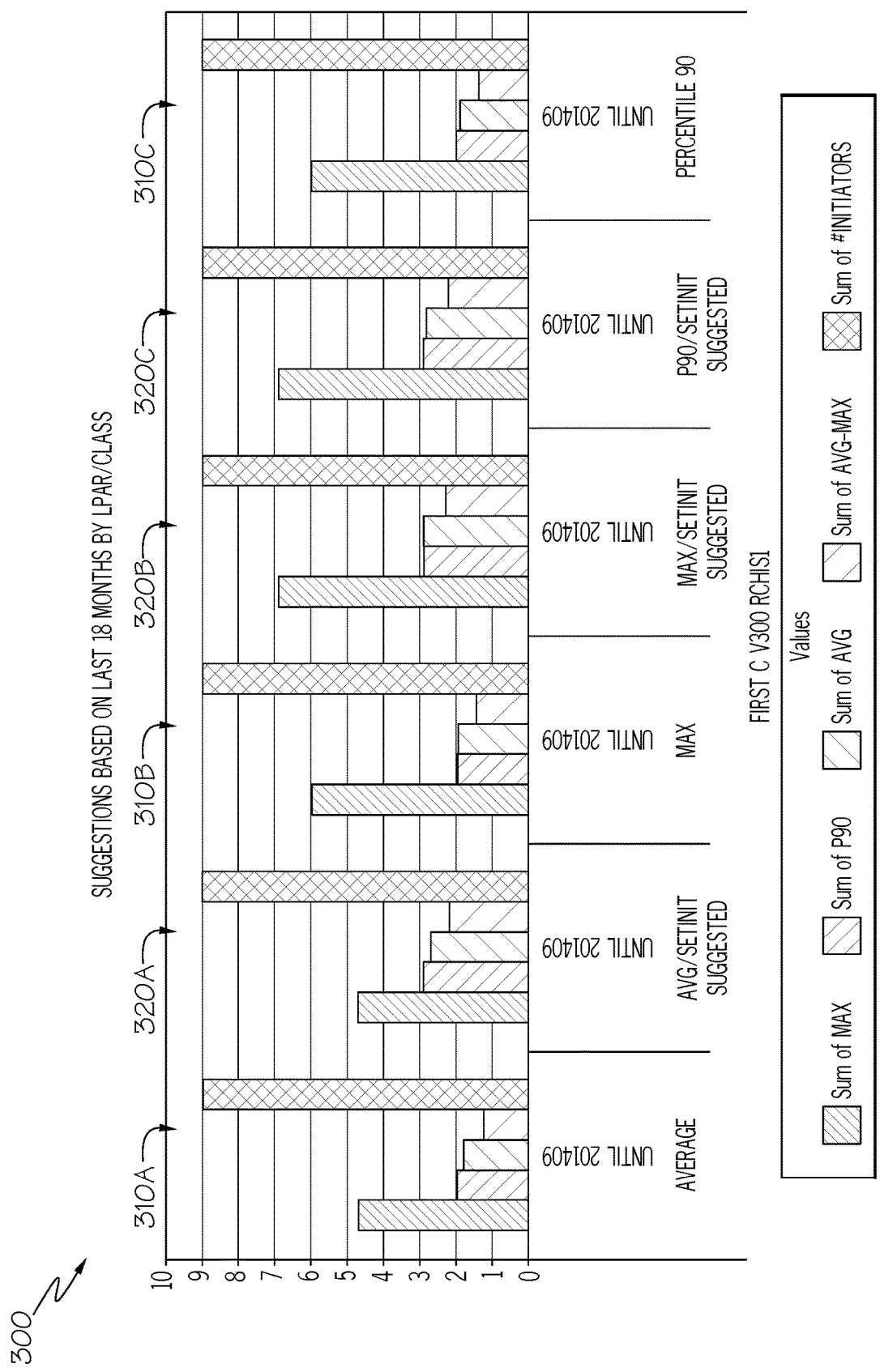
FIG. 5 depicts a graph showing an example set of allocation selections according to an embodiment of the present invention.

Referring now to FIG. 5, a graph 300 showing an example set of allocation selections 320A-C is shown according to an embodiment of the invention. As shown, historical allocation data have been represented in three sets that correspond to the average 310A, maximum (peak) 310B, and percentile 90 310C data for the time period. Moreover, allocation selections have been generated based on this historical allocation data in three sets that correspond to the average 310A, maximum (peak) 310B, and percentile 90 310C.

Referring again to FIG. 2 in conjunction with FIGS. 3 and 4, initiator allocation implementing module 96 of system 72, as executed by computer system/server 12 is configured to select an allocation selection from the plurality of allocation selections based on a key performance indicator (KPI) factor. The KPI factor(s) can be measured by performance tools and can include, but are not limited to: number of users, memory utilized, storage utilized, processing resources utilized, etc. Whatever the case, this selected allocation selection can then be implemented 236 on mainframe system 82 by dynamic allocation engine 234. Once implemented, this allocation selection will specify how many initiators 130A-N are currently assigned to each workload class.

Figure 6:
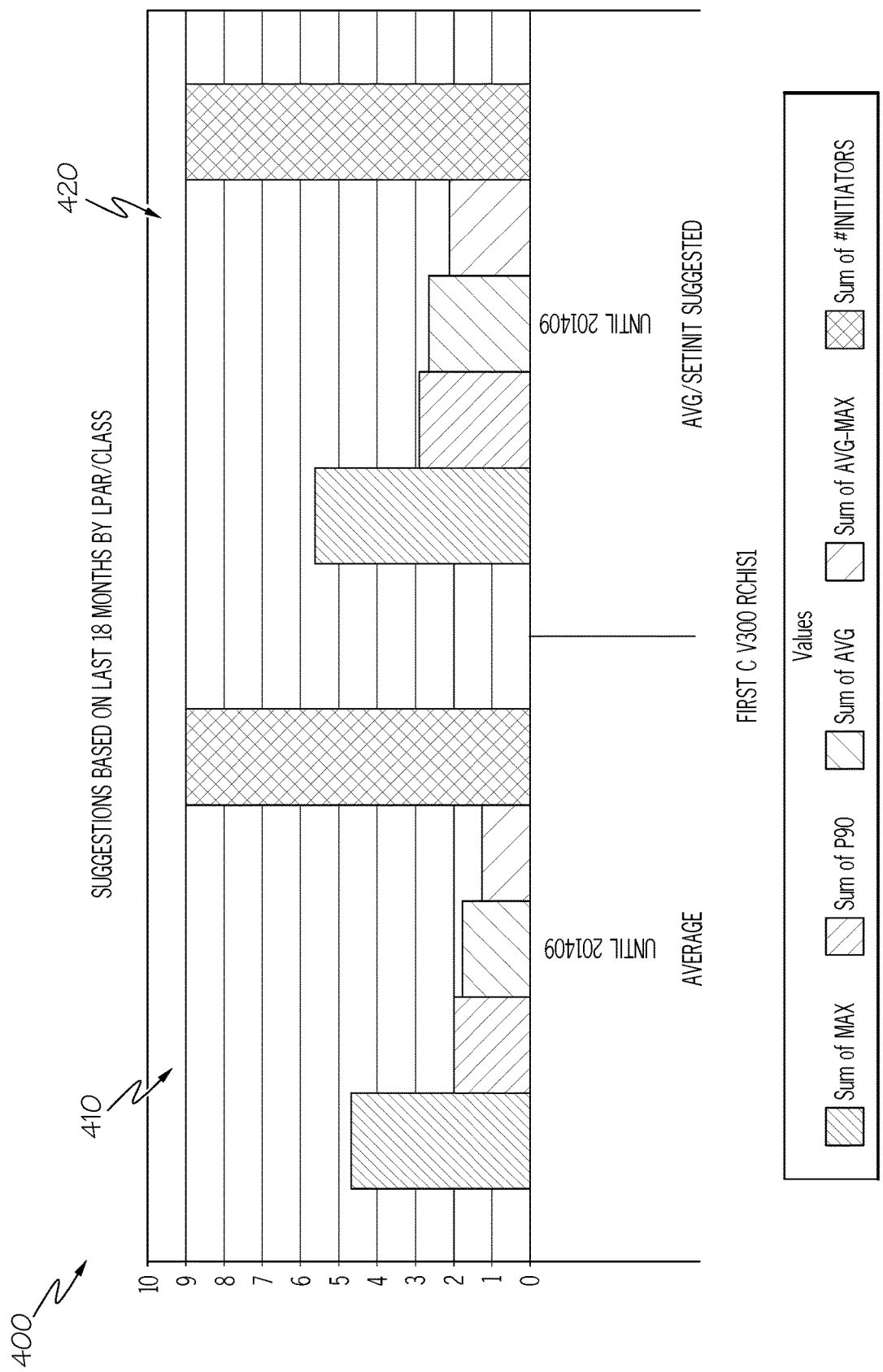
FIG. 6 depicts a graph showing a selected allocation selection according to an embodiment of the present invention.

Referring now to FIG. 6, a graph 400 showing an example selected allocation selection 420 is shown according to an embodiment of the invention. In this example, we can assume that the KPI factors indicate that usage is at or below an average amount. As such, as shown, an average allocation selection 420, which is shown along with the corresponding average historical allocation 410, has been selected from among allocation selections 320A-C in FIG. 5.

Referring again to FIG. 2 in conjunction with FIGS. 3 and 4, the dynamic nature of initiator allocation implementing module 96 allows it to dynamically adjust allocation of initiators 130A-N in response to changing conditions. For example, as time passes, the historical allocation data may indicate that the current allocation of initiators 130A-N among the workload classes should be changed to reflect the new distribution of workloads 122A-N among workloads that is expected for the new time period. In response, allocation selection generating module 94 can generate a new group of allocation selections and a new allocation can be selected from this group based on the current KPI factors.

Similarly, initiator allocation implementing module 96 can dynamically adjust allocation of initiators 130A-N in response to changing KPI factors by changing the allocation selection from the current allocation to another one of the previously generated allocation selections. Such a change would not result in a transfer of initiators 130A-N from one workload class to another, but rather, would proportionally raise or lower number of initiators 130A-N allocated to each class based on the new allocation selection.

For example, if a new client initiated workload 81 is received in common batch queue 120, system 72 can determine whether the current allocation selection is able to accommodate the new client initiated workload 81. This can be done by forecasting whether the KPI will be impacted by the new workload in such a way that the current allocation selection is no longer valid. If it is determined that the allocation selection is not able to accommodate the new client initiated workload the allocation selection can be modified. This modification can include selecting a different allocation selection from the previously generated allocation selections if the allocation selection can accommodate the new client initiated workload on the mainframe. For example, if the current allocation selection is an average allocation selection and changing the allocation selection to a percentile 90 allocation selection can accommodate the new client initiated workload, initiator allocation implementing module 96 can change the selection to the percentile 90 allocation selection for implementing on the mainframe system 82. Alternatively, if the allocation selection is currently at a maximum or the new client initiated workload 81 push the KPI factors above the maximum allowed, a determination could be made that no allocation selection can accommodate the new client initiated workload. In that case, the new client initiated workload can be rescheduled to such a time that it is forecasted that it will be able to operate without adversely affecting other workloads 122A-N.

Figure 7:
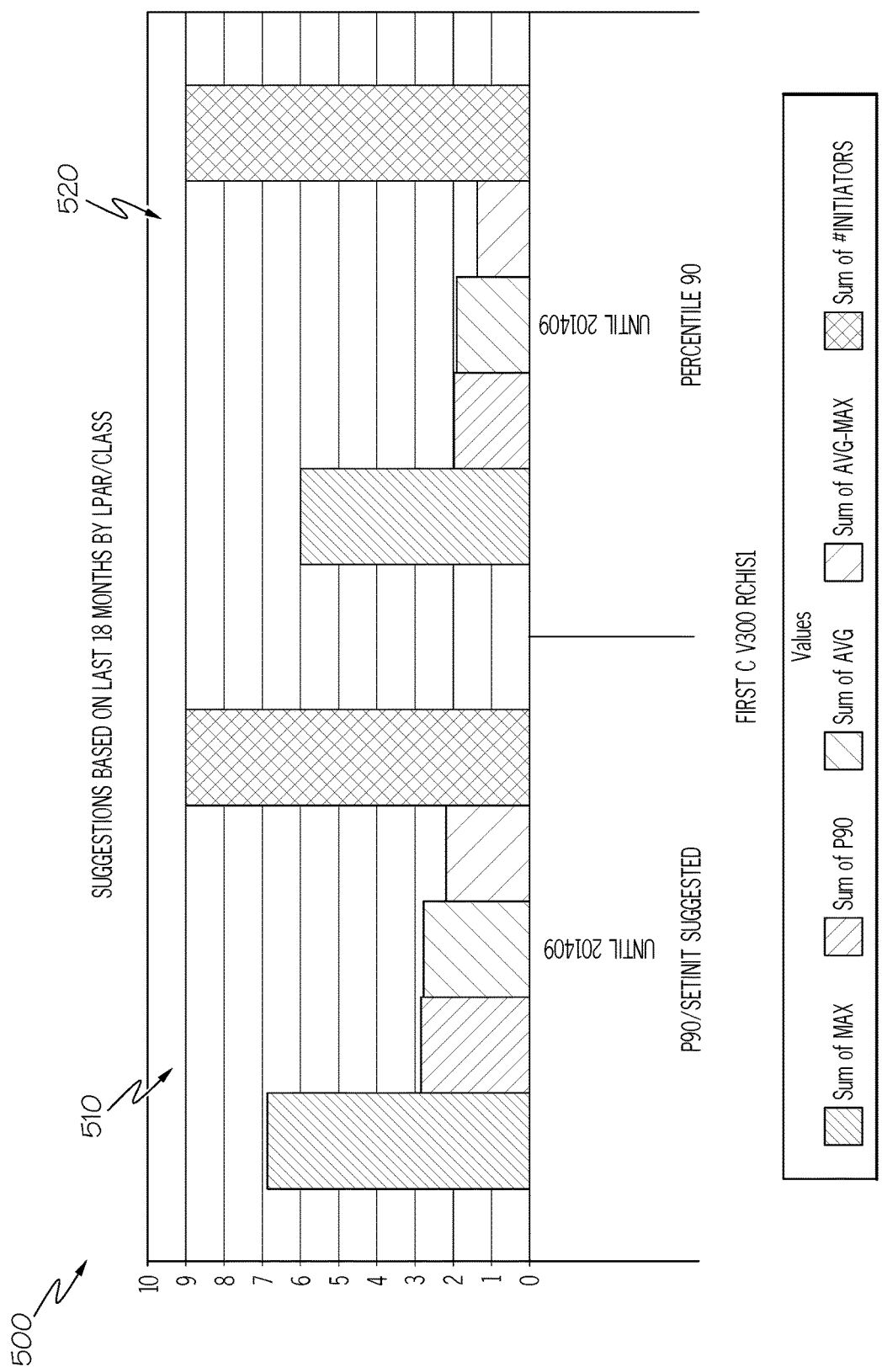
FIG. 7 depicts a graph showing a modified allocation selection according to an embodiment of the present invention.

Referring now to FIG. 7, a graph 500 showing an example modified allocation selection 520 is shown according to an embodiment of the invention. In this example, we can assume that conditions have changed (e.g., by the arrival of unexpected new workloads) such that the KPI factors no longer indicate that usage is at or below an average amount. Because of this, average allocation selection 420 (FIG. 6) is no longer sufficient to accommodate the workloads in one or more workload classes. As such, as shown, a new percentile 90 allocation selection 520, which is shown along with the corresponding average historical allocation 510, has been selected from among allocation selections 320A-C in FIG. 5.

Figure 8:
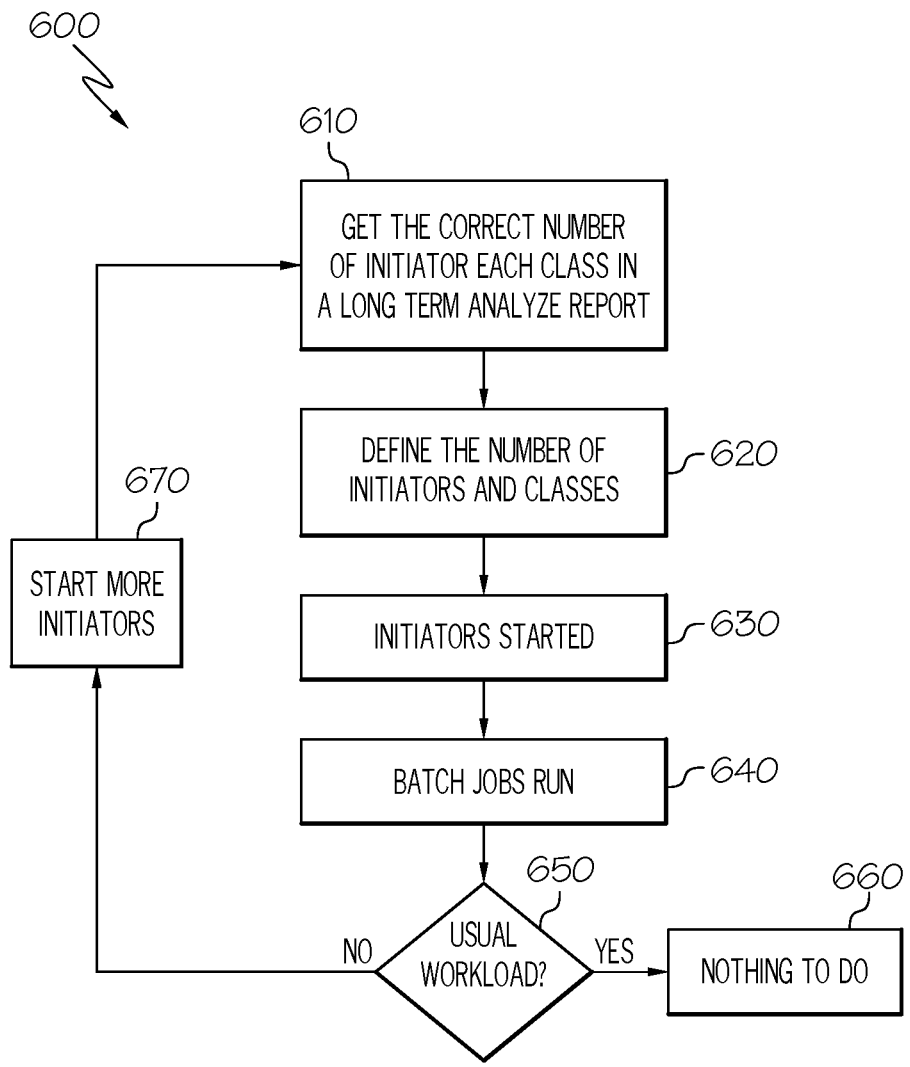
FIG. 8 depicts an example process flow according to an embodiment of the present invention.

Referring now to FIG. 8 in conjunction with FIGS. 2 and 3, a method flow diagram 600 according to an embodiment of the present invention is shown. At 610, the correct number of initiators required for each class is determined based on a long term (e.g., at least 18 months) analysis report. At 620, the number of initiators 130A-N and classes are defined on mainframe system 82. At 630, the initiators 130A-N are started and workloads 122A-N (e.g., batch jobs, among others) are run at 640. At 650, a determination is made as to whether the current overall workload on mainframe system 82 is usual. If so, at 660, no further action needs to be taken. Otherwise, at 670, more initiators are started and flow returns to 610.

Figure 9:
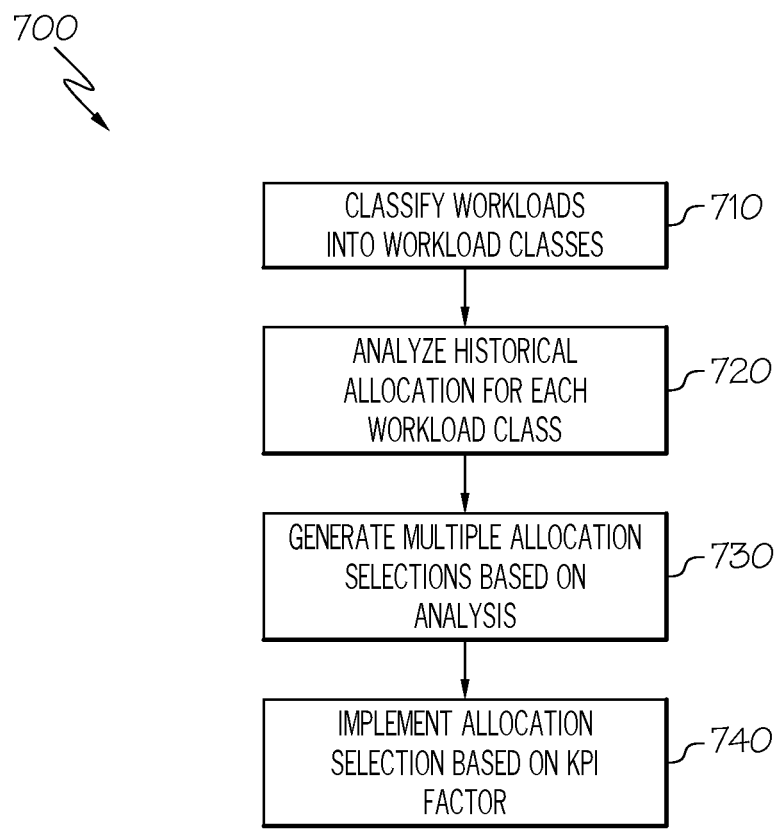
FIG. 9 depicts an example process flow according to an embodiment of the present invention.

Referring now to FIG. 9 in conjunction with FIGS. 2 and 3, a method flow diagram 700 according to an embodiment of the present invention is shown. At 710, workload classification module 90 of system 72, as executed by computer system/server 12, classifies each workload 122N of a plurality of workloads 122A-N on computer mainframe system 82 into one of a plurality of workload classes such that the workloads 122A-N in each workload class are grouped together based on a common objective. At 720, historical allocation analyzing module 92 of system 72, as executed by computer system/server 12, analyzes a historical allocation of initiators 130A-N in mainframe system 82 for each workload class. At 730, allocation selection generating module 94, generates a plurality of allocation selections based on the analysis. Each generated allocation selection assigns a number of initiators 130A-N to each workload class based on the historical utilization data. At 740, allocation selection generating module 96 of system 72, as executed by computer system/server 12, implements an allocation selection that is selected from the generated allocation selections. This selection is made base on a KPI factor.

The flows of FIGS. 8 and 9 illustrate the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for allocating mainframe resources in a networked computing environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for responding to a threat. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for allocating mainframe resources in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, availability detector 118 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for allocating mainframe resources in a networked computing environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for allocating mainframe resources in a networked computing environment, the method comprising the computer-implemented processes of:
    classifying, using a computer device, each workload of a plurality of workloads on a computer mainframe system into one of a plurality of workload classes, the workloads in each workload class of the plurality of workload classes being grouped together based on a common objective;
    analyzing, using the computer device, a historical allocation of initiators in a mainframe system for each workload class;
    generating, by the computer device, a plurality of allocation selections for a current time period based on the analysis, each allocation selection of the plurality of allocation selections assigning a number of initiators, each of which reads, interprets, and executes workload job control language (JCL) to begin workload execution, to each workload class based on the historical utilization data; and
    implementing, by the computer device, an allocation selection selected from the plurality of allocation selections based on a key performance indicator (KPI) factor that is based on an amount of current system utilization.

2. The method of claim 1, further comprising:
    populating an indexed database with usage information including a start time and an end time of each workload on the mainframe over an extended time period;
    analyzing the usage information to determine mainframe usage by workload class for each second on the mainframe; and
    determining a set of periodic usage patterns for each workload class based on the mainframe usage.

3. The method of claim 1, wherein the workloads include batch jobs and client initiated workloads.

4. The method of claim 3, further comprising:
    determining, in response to a receipt of a new client initiated workload, whether an objective of the new client initiated workload matches the objective of an existing workload class; and assigning, in response to a determination that the objective matches that of the existing workload class, the workload to the existing workload class, otherwise creating a new workload class.

5. The method of claim 4, further comprising:

determining, in response to the receipt of the new client initiated workload, whether the allocation selection is able to accommodate the new client initiated workload; and modifying the allocation selection in response to a determination that the allocation selection is not able to accommodate the new client initiated workload.

6. The method of claim 5, wherein the modifying includes:

selecting a different pre-generated allocation selection of the plurality of allocation selections if the allocation selection can accommodate the new client initiated workload on the mainframe; and rescheduling the new client initiated workload if no allocation selection of the plurality of allocation selections can accommodate the new client initiated workload on the mainframe.

7. The method of claim 1, wherein the networked computing environment is a cloud computing environment and wherein the mainframe executes a Z/OS operating system and wherein the initiator reads, interprets, and executes the job control language (JCL) in the Z/OS operating system.

8. A system for allocating mainframe resources in a networked computing environment, comprising:

a memory medium comprising instructions;

a bus coupled to the memory medium; and a processor coupled to the bus that when executing the instructions causes the system to:

classify each workload of a plurality of workloads on a computer mainframe system into one of a plurality of workload classes, the workloads in each workload class of the plurality of workload classes being grouped together based on a common objective;

analyze a historical allocation of initiators in a mainframe system for each workload class;

generate a plurality of allocation selections for a current time period based on the analysis, each allocation selection of the plurality of allocation selections assigning a number of initiators, each of which reads, interprets, and executes workload job control language (JCL) to begin workload execution, to each workload class based on the historical utilization data; and implement an allocation selection selected from the plurality of allocation selections based on a key performance indicator (KPI) factor that is based on an amount of current system utilization.

9. The system of claim 8, the instructions further causing the system to:

populate an indexed database with usage information including a start time and an end time of each workload on the mainframe over an extended time period;

analyze the usage information to determine mainframe usage by workload class for each second on the mainframe; and determine a set of periodic usage patterns for each workload class based on the mainframe usage.

10. The system of claim 9, wherein the workloads include batch jobs and client initiated workloads.

11. The system of claim 10, the instructions further causing the system to:

determine, in response to a receipt of a new client initiated workload, whether an objective of the new client initiated workload matches the objective of an existing workload class; and assign, in response to a determination that the objective matches that of the existing workload class, the workload to the existing workload class, otherwise creating a new workload class.

12. The system of claim 11, the instructions further causing the system to:

determine, in response to the receipt of the new client initiated workload, whether the allocation selection is able to accommodate the new client initiated workload; and modify the allocation selection in response to a determination that the allocation selection is not able to accommodate the new client initiated workload.

13. The system of claim 12, the instructions causing the system to modify further causing the system to:

select a different pre-generated allocation selection of the plurality of allocation selections if the allocation selection can accommodate the new client initiated workload on the mainframe; and reschedule the new client initiated workload if no allocation selection of the plurality of allocation selections can accommodate the new client initiated workload on the mainframe.

14. The system of claim 8, wherein the networked computing environment is a cloud computing environment and wherein the mainframe executes a Z/OS operating system and wherein the initiator reads, interprets, and executes the job control language (JCL) in the Z/OS operating system.

15. A computer program product for allocating mainframe resources in a networked computing environment, the computer program product comprising a computer readable hardware storage device, and program instructions stored on the computer readable hardware storage device, to:

classify each workload of a plurality of workloads on a computer mainframe system into one of a plurality of workload classes, the workloads in each workload class of the plurality of workload classes being grouped together based on a common objective;

analyze a historical allocation of initiators in a mainframe system for each workload class;

generate a plurality of allocation selections for a current time period based on the analysis, each allocation selection of the plurality of allocation selections assigning a number of initiators, each of which reads, interprets, and executes workload job control language (JCL) to begin workload execution, to each workload class based on the historical utilization data; and implement an allocation selection selected from the plurality of allocation selections based on a key performance indicator (KPI) factor that is based on an amount of current system utilization.

16. The computer program product of claim 15, the computer readable storage device further comprising instructions to:

populate an indexed database with usage information including a start time and an end time of each workload on the mainframe over an extended time period;

analyze the usage information to determine mainframe usage by workload class for each second on the mainframe; and determine a set of periodic usage patterns for each workload class based on the mainframe usage.

17. The computer program product of claim 15, the workloads including batch jobs and client initiated workloads and the computer readable storage device further comprising instructions to:
  determine, in response to a receipt of a new client initiated workload, whether an objective of the new client initiated workload matches the objective of an existing workload class; and
  assign, in response to a determination that the objective matches that of the existing workload class, the workload to the existing workload class, otherwise creating a new workload class.

18. The computer program product of claim 17, the computer readable storage device further comprising instructions to:
  determine, in response to the receipt of the new client initiated workload, whether the allocation selection is able to accommodate the new client initiated workload; and
  modify the allocation selection in response to a determination that the allocation selection is not able to accommodate the new client initiated workload.

19. The computer program product of claim 18, the instructions to modify further comprising instructions to:
  select a different pre-generated allocation selection of the plurality of allocation selections if the allocation selection can accommodate the new client initiated workload on the mainframe; and
  reschedule the new client initiated workload if no allocation selection of the plurality of allocation selections can accommodate the new client initiated workload on the mainframe.

20. The computer program product of claim 15, wherein the networked computing environment is a cloud computing environment and wherein the mainframe executes a Z/OS operating system and wherein the initiator reads, interprets, and executes the job control language (JCL) in the Z/OS operating system.

* * * * *

UNITED STATES PATENT AND TRADEMARK OFFICE
CERTIFICATE OF CORRECTION

PATENT NO. : 11,016,813 B2
APPLICATION NO. : 16/199695
DATED : May 25, 2021
INVENTOR(S) : Filho et al.

Page 1 of 1

It is certified that error appears in the above-identified patent and that said Letters Patent is hereby corrected as shown below:

On the Title Page

Item (72) Inventors:
Aldair F. Filho, Aimores, Delete "BZ" and Insert -- BR --
Juscelino Candido de Lima Junior, Campinas, Delete "BZ" and Insert -- BR --
Marcos Vinicius L. Paraiso, Campinas, Delete "BZ" and Insert -- BR --
Rosanna Rueda Elias, Campinas, Delete "BZ" and Insert -- BR --
Ana Silvia Moretto Braga, Campinas, Delete "BZ" and Insert -- BR --

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*